United States Patent

[11] 3,601,422

[72] Inventor Alexander Richard Woods
    Hampton Wick, Surrey, England
[21] Appl. No. 817,537
[22] Filed Apr. 18, 1969
[45] Patented Aug. 24, 1971
[73] Assignee Lansing Bagnall Limited
    Hampshire, England
[32] Priority Apr. 23, 1968
[33] Great Britain
[31] 19030/68

[54] INDUSTRIAL TRUCKS
    7 Claims, 12 Drawing Figs.
[52] U.S. Cl. ................................................. 280/91,
    180/79.2 R
[51] Int. Cl. ...................................................... B62d 3/02
[50] Field of Search ........................................... 180/79.2,
    45; 280/91

[56] References Cited
    UNITED STATES PATENTS
1,866,393 7/1932 Brooks .......................... 280/91
3,087,564 4/1963 Quayle .......................... 280/91 X
3,197,229 7/1965 Houlton ......................... 280/91

3,255,840 6/1966 Tangen .......................... 180/79.2 X

Primary Examiner—Benjamin Hersh
Assistant Examiner—John A. Pekar
Attorney—E. T. LeGates ABSTRACT: An industrial truck has four ground wheels, four hydraulically operated rack and pinion devices for individually adjusting each wheel angularly about a vertical axis whereby the truck may be driven in a plurality of alternative directions according to the adjusted positions of the wheels, and a steering mechanism for simultaneously effecting steering movements of the wheels in various adjusted positions thereof, which steering mechanism comprises a first linkage connecting a first pair of wheels so that those wheels are steered in the same direction as each other, a second linkage connecting the second pair of wheels so that those wheels are steered in the same direction as each other, and a member connectable by two alternative connections on opposite sides of the pivot point of a lever forming part of the second linkage. One of the connections so connects the two linkages that the two pairs of wheels are steered in the same direction and the other connection so connects the two linkages that the two pairs of wheels are steered in opposite directions.

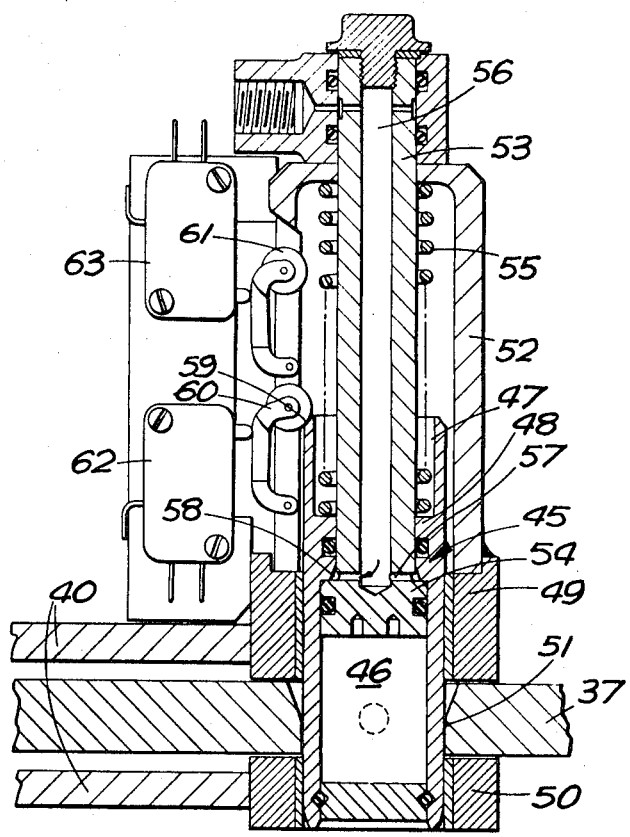

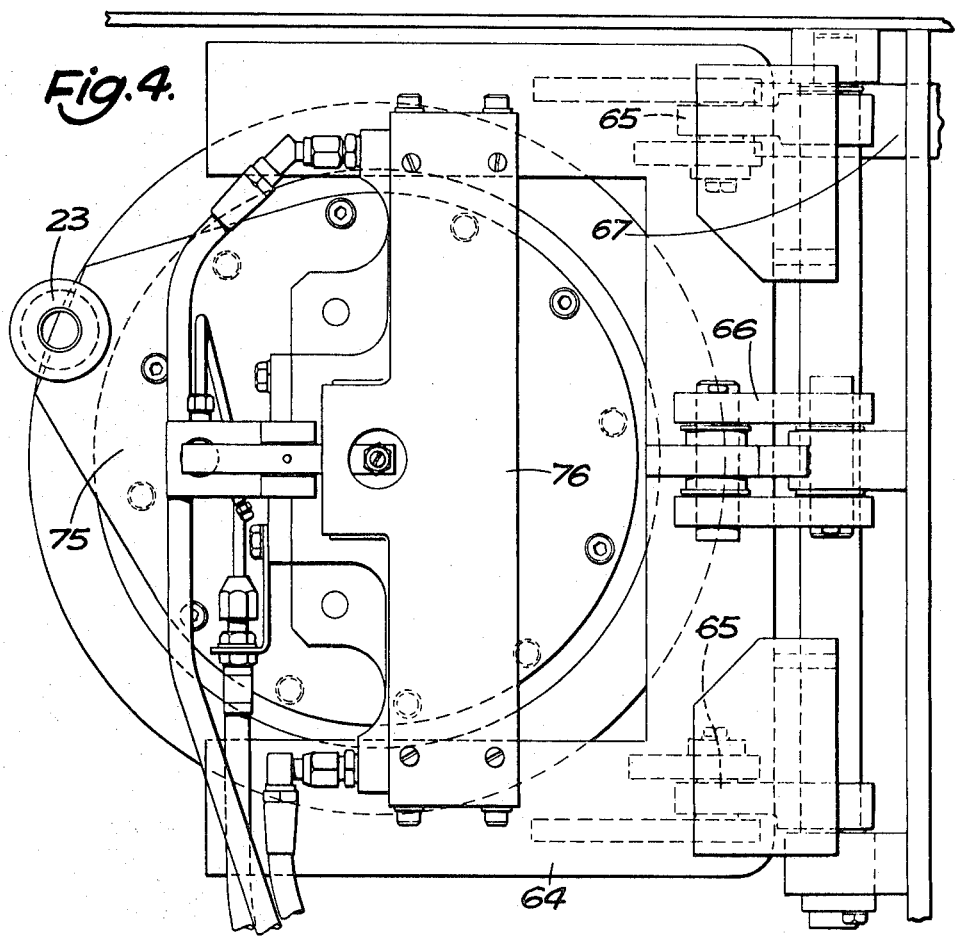
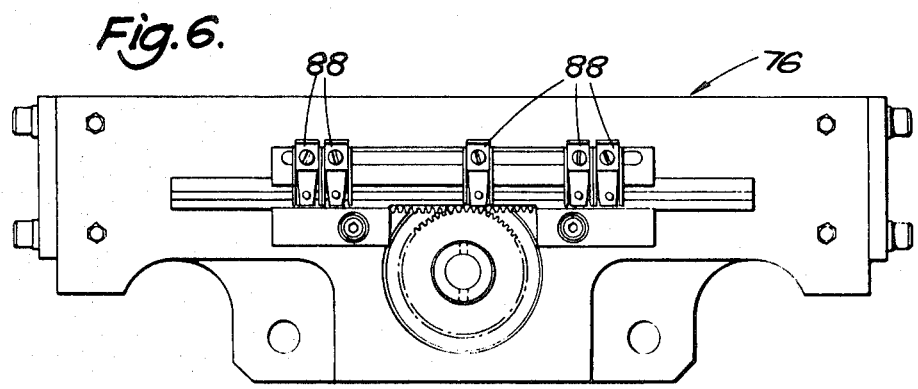

INDUSTRIAL TRUCKS

The invention relates to industrial trucks and more particularly to trucks having four ground wheels and a steering mechanism for simultaneously effecting steering of the wheels.

Such trucks are normally movable in a forward or reverse direction, the wheels being steered to guide the truck during forward or reverse movement. However it may be desirable for the truck to be driven in directions other than the forward and reverse directions and for this purpose there may be provided means for individually adjusting each wheel angularly about a vertical axis whereby the truck may be driven in a plurality of alternative directions according to the adjusted positions of the wheels. For example the wheels may be adjusted through 90° so that the truck can be moved sideways. However when a truck is being driven forwards, when steering takes place the rear pair of wheels is normally steered in the opposite direction to the front pair of wheels. That is to say if it is wished to steer the vehicle to the right the front pair of wheels will be turned clockwise whereas the rear pair of wheels will be turned anticlockwise. It will be appreciated that if the wheels are adjusted, for example through 90° for sideways movements, the steering configuration will no longer be appropriate since different pairs of wheels will then be the "front" and "rear" wheels and it is necessary for each pair of wheels to be steered in the same direction. The invention provides an industrial truck which may be driven in a number of different directions and in which the configuration of the steering mechanism may be adjusted according to the direction in which the vehicle is being driven.

According to the invention an industrial truck has four ground wheels, means for individually adjusting each wheel angularly about a vertical axis whereby the truck may be driven in a plurality of alternative directions according to the adjusted position of the wheels, and a steering mechanism for simultaneously effecting steering movements of the wheels, which steering mechanism comprises a first linkage connecting a first pair of wheels so that those wheels are steered in the same direction as each other, a second linkage connecting the second pair of wheels so that those wheels are steered in the same direction as each other, and a member connectable between the two linkages by two alternative connections, one of which connections so connects the two linkages that the two pairs of wheels are steered in the same direction and the other of which connections so connects the two linkages that the two pairs of wheels are steered in opposite directions.

Thus, when the wheels of the vehicle are adjusted for travel in the normal forward or reverse direction said other connection is used so that the front pair of wheels are steered in the opposite direction to the rear pair of wheels as described above. However, when the wheels are adjusted for the truck to be driven sideways said one connection is used so that the two pairs of wheels are steered in the same direction so that the truck can be steered whilst moving sideways.

Preferably both of said alternative connections can be connected at the same time to lock the steering mechanism. The steering mechanism may thus be locked during angular adjustment of the individual wheels about a vertical axis.

The second linkage may include a lever mounted on a pivotal support which lever, when pivoted in one sense, causes said linkage to steer the second pair of wheels in one direction and, when pivoted in the opposite sense, causes said linkage to steer the second pair of wheels in the opposite direction, and said member may be alternatively connectable to said lever by two detachable connections disposed on opposite sides of said pivotal support. Thus, the direction in which the second pair of wheels is steered in relation to the first pair of wheels may be changed by using one or other of the detachable connections.

Each said detachable connection between said member and lever may comprise a pin movably mounted on one part and engageable with an aperture on the other part. Preferably the pin is mounted on said member and is engageable with an aperture on said lever.

Fluid energized means may be provided for moving the pin. Also a spring may be provided to urge the pin into engagement with said aperture, said fluid energized means acting to withdraw the pin from the aperture against the action of the spring.

In any of the above arrangements each wheel may be mounted on a support which is in turn mounted on the truck for rotation about a vertical axis, said supports being connected by said linkages for effecting steering of the wheels, and said means for individually adjusting each wheel angularly about a vertical axis may comprise means for rotating each wheel about a vertical axis relatively to its support.

Said means for rotating each wheel about a vertical axis relatively to its support may comprise a rack and pinion mechanism. Also said means may be hydraulically actuated.

The following is a more detailed description of one embodiment of the invention reference being made to the accompanying drawings in which:

FIG. 3 is a section along the line 3—3 of FIG. 2;

FIG. 4 is a more detailed plan view of one of the wheel units of the truck;

FIG. 6 is a plan view of one of the hydraulic actuators for adjusting the wheel units;

The industrial truck forming the subject of this example is a lift truck having an arrangement comprising a mast 10 and load carriage 11 which are capable of a movement to one side of the truck in known manner. The truck is also provided with four steerable ground wheel units 1, 2, 3 and 4, one at each corner of the truck. Also, in this example, the wheel of each wheel unit is driven by an electric motor (not shown) incorporated in the wheel unit. Since this invention is concerned only with the steering mechanism provided for controlling the steering movements of the ground wheel units, the remainder of this description will be limited thereto.

Figure 9:
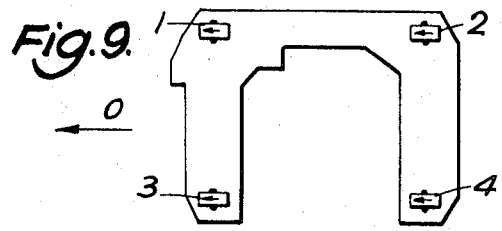
FIGS. 9, 10 and 11 are diagrammatic plan views of the truck showing various positions adopted by the wheel units.
Figure 10:
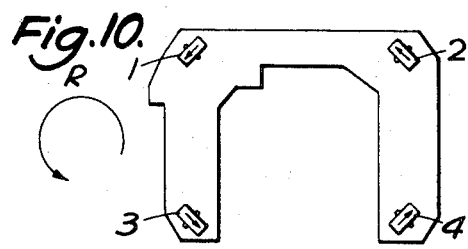
Figure 11:
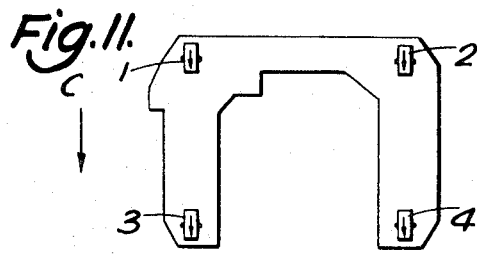

In one corner of the truck, above the wheel unit 1, there is an operator's compartment provided with a steering wheel (not shown) which is capable of steering all four wheel units simultaneously by a steering mechanism which is described in detail below. In addition the wheel of each wheel unit is also individually rotatable about a vertical axis by an hydraulic actuator mounted on the wheel unit, which actuator is operable from the operator'a compartment. Electrical control mechanism, described below, is provided in the operator's compartment for rotating each wheel unit about its vertical axis through a predetermined angle. By means of individually positioning each of the four wheels, the truck may be driven in a forward direction (by positioning the wheels as shown in FIG. 9), or in a sideward direction (as shown in FIG. 11) or around a fixed vertical axis (as shown in FIG. 10).

During movement of the truck in a forward or a sideward direction it is possible to employ the truck-steering mechanism to effect steering movement of the wheel units. It will be appreciated, however, that, as mentioned earlier, different configurations of the steering mechanism are required for forward or sideward movement of the truck.

Rotation of the steering wheel effects longitudinal movement of a link 12 by means of conventional steering gear 13. The end of the link 12 is pivotally connected to one arm 14 of a crank lever 15 which is mounted on a pivot 16 for pivotal movement about a vertical axis. Another arm 17 of the crank lever 15 is pivotally connected to one end of a further link 18 the opposite end of which is pivotally connected to a further crank lever 19 which is mounted on a pivot 20 for pivotal movement about a vertical axis.

The crank lever 19 comprises an arm 21 to which is pivotally connected one end of a link 22. The opposite end of the link 22 is pivotally connected to a boss 23 part of the wheel unit 1 so that longitudinal movement of the link 22 effects rotation of the wheel unit about its central vertical axis. The crank lever 19 also comprises a second arm 24 to which is pivotally connected one end of a link 25 the opposite end of which is pivotally connected to a boss 26 on the wheel unit 3. It will be appreciated that longitudinal movement of the link 12 by rotation of the steering wheel will thus effect steering movements of the two front wheel units 1 and 3, both wheel units being steered in the same direction but by different amounts, (in like manner to an Ackermann steering mechanism). When the link 12 is moved in the direction of the arrow A both front wheel units 1 and 3 will be rotated about their vertical axes in a clockwise direction (as viewed in FIG. 1) and when the link is moved in the opposite direction both wheel units will be rotated in an anticlockwise direction.

A similar link and lever mechanism is provided connecting the rear wheel units 2 and 4. A link 27 is pivotally connected at one end to a crank lever 28 which is mounted on a pivot 29 for pivotal movement about a vertical axis. One arm 30 of the crank lever 28 is pivotally connected to one end of a link 31 the opposite end of which is pivotally connected to a boss 32 on the wheel unit 2. The other arm 33 of the crank lever 28 is pivotally connected to one end of a link 34 the opposite end of which is pivotally connected to a boss 35 on the wheel unit 4.

Figure 2:
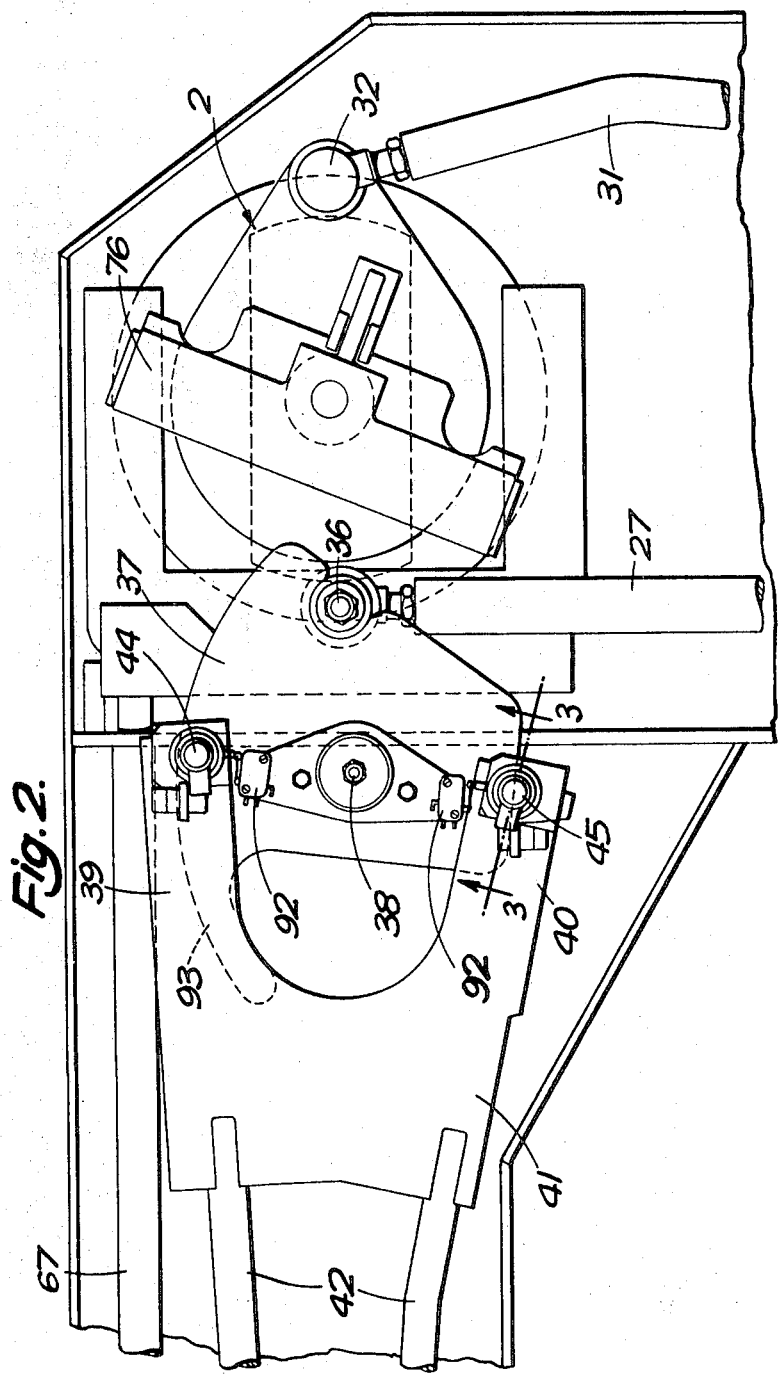
FIG. 2 is an enlarged view of a portion of the steering mechanism shown in FIG. 1.

The link 27 coupled to the crank lever 15 by a linkage shown in greater detail in FIG. 2.

Figure 1:
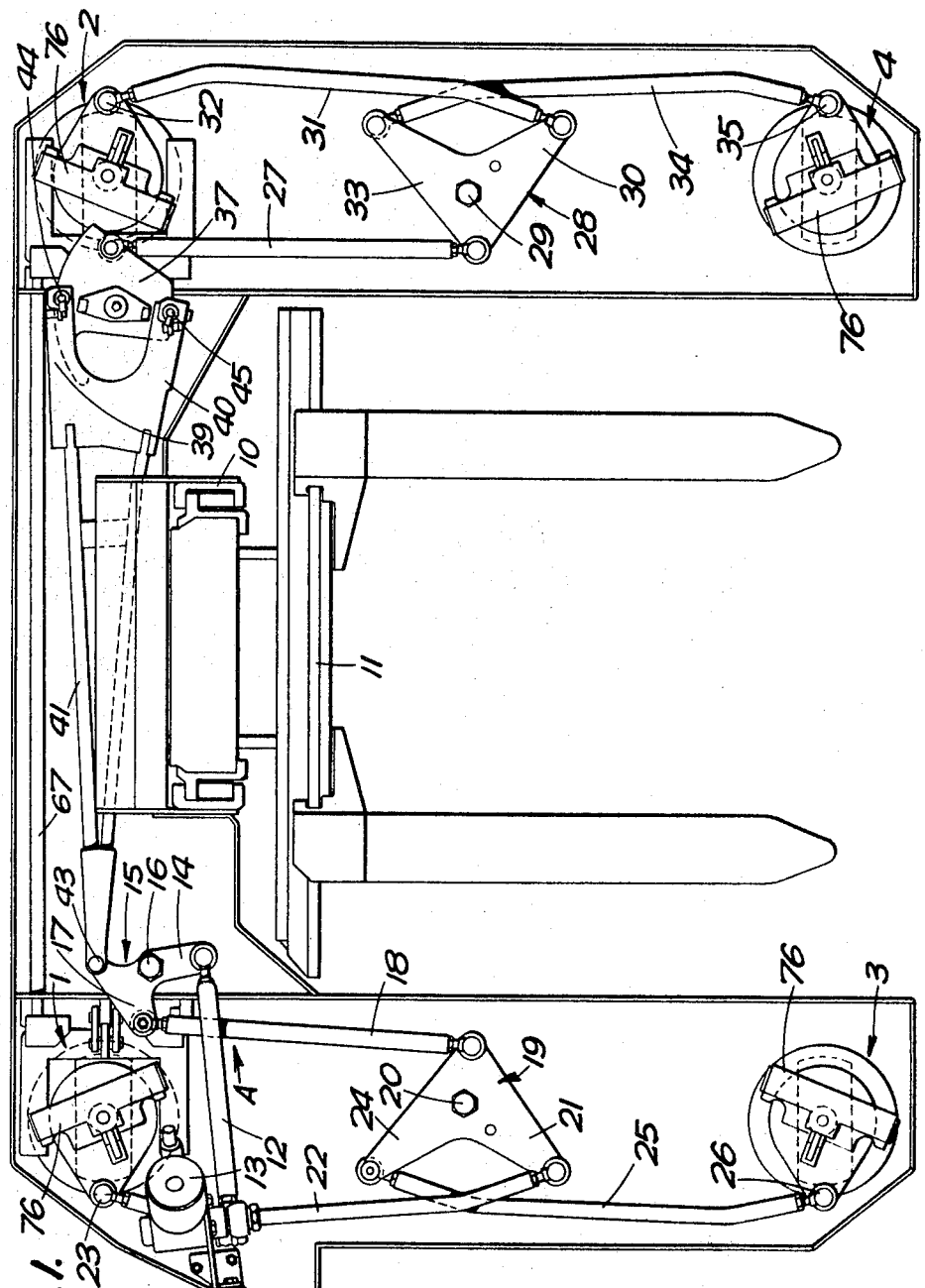
FIG. 1 is a plan view of the steering mechanism of an industrial truck having four interconnected ground wheel units.

As best seen in FIG. 2 the link 27 is pivotally connected at 36 to a plate 37 which is mounted for pivotal movement about a vertical axis 38. Disposed above and below the plate 37 are a pair of spaced parallel U-shaped plates 41. Each plate 41 has limbs 39 and 40 disposed on either side of the axis 38. The plates 41 are secured at the end of a V-shaped link 42 the opposite end of which is pivotally connected at 43 to the crank lever 15 (as best seen in FIG. 1).

The limbs 39 carry a vertically movable pin 44 which is engageable with a hole in the plate 37 and the limbs 40 carry a similar pin 45 which is also engageable with a hole in the plate 37. FIG. 3 shows a vertical section through the pin 45 and associated mechanism and it will be understood that the pin 44 and associated mechanism are similarly arranged.

Referring to FIG. 3 the pin 45 comprises two hollow portions 46 and 47 separated by an annular shoulder 48. The pin 45 is vertically slidable in a bearing ring 49 secured on the upper on the limbs 40 which bearing ring registers with a similar lower bearing ring 50 secured to the end of the lower limb 40. A hole 51 in the plate 37 can be brought into register with the apertures in the bearing rings 49 and 50 so that the pin 45 may be passed through the hole to the position shown in FIG. 3 so as to lock the limbs 40 to the plate 37.

A hollow support element 52 is secured above the bearing ring 49 and has mounted within it a vertical shaft 53 formed at its lower end with a plunger 54 over which the hollow portion 46 of the pin 45 is slidable. A helical compression spring 55 is disposed between the support element 52 and the shoulder 48 on the pin 45 so as to tend to urge the pin downwardly. The shaft 53 is formed with a central passage 56 which is in communication, through a solenoid-operated valve, with the hydraulic system of the vehicle. At the lower end of the passage 56 there are provided small radial passages 57 which communicate with a conical internal surface 58 on the lower part of the shoulder 48. Thus when the passage 56 is in communication with hydraulic fluid under pressure this pressure is communicated to the conical surface 58 urging the pin 45 upwardly. The upper rim 59 of the pin 45, as the pin moves upwardly, engages in turn the operating elements 60 and 61 of microswitches 62 and 63 respectively mounted on the support element 52. The function and operation of the microswitches 62 and 63 will be described in detail below.

The pin 44 is similarly engageable with a hole in the plate 37.

In operation if both the pins 44 and 45 are engaged the steering mechanism will be locked and it will be possible to rotate the wheels individually about their vertical axes by means of the above-mentioned hydraulic actuator in the manner to be described below. It will thus be possible to move the wheel units into position for moving the truck in a forward direction or into another position for moving the truck in a sideward direction or yet another position for rotating the truck around a fixed axis. On the other hand, once the wheel units have been so positioned, it is then possible for the truck operator to withdraw one of the pins 44 and 45 (depending on the position of the wheels) and then to effect the appropriate simultaneous steering movements of the four wheel units by operating the steering wheel.

In the case of the truck being required to move in a forward direction (or in a reverse direction) the wheels of the wheel units are set in the ordinary or straight ahead position shown in FIG. 9. The pin 44 is then withdrawn and longitudinal movement of the link 12 in the direction of the arrow A will effect steering of the front wheel units 1 and 3 in a clockwise direction and steering of the rear wheel units in an anticlockwise direction. Similarly the steering movements will be reversed if the longitudinal movement of the link 12 is reversed. It is to be appreciated that, in this condition, relative movement is possible between the limbs 39 of the link 42 and the plate 37. The plate 37 has an extension 93 so that a part of the plate is always disposed beneath the pin 44 during steering movement. This prevents the possibility of the pin falling and jamming against the side of the plate should the hydraulic pressure fail for any reason.

To drive the truck sideways, the pin 44 is reengaged with the plate 37, locking the steering mechanism and the wheels are each turned through 90° to the position shown in FIG. 11. The pin 45 is then withdrawn and the truck is then ready for steered movement in a sideward direction. In this case longitudinal movement of the link 12 in the direction of arrow A will effect steering movement of the wheel units 1 and 3 in a clockwise direction as before, but the other wheel units 2 and 4 will be steered also in a clockwise direction as is appropriate for sideward movement of the truck.

If it is required to rotate the truck about a vertical axis both pins 44 and 45 are inserted and the wheels turned by their hydraulic actuators to the position shown in FIG. 10. During this rotation of the truck it will be appreciated that no steering of the wheels is required and thus the steering mechanism remains locked, by both pins 44 and 45 being inserted, during rotation of the truck. Microswitches 92 mounted on the plate 37 are arranged to be operated when the pins 44 and 45 respectively come opposite their associated holes in the plate. The microswitches 92 are arranged to illuminate indicator lamps near the operator so that he can readily see when the mechanism has been brought to a position in which either of the pins can be inserted.

There will now be described the wheel units and the hydraulic actuators for adjusting the positions of the wheels about their vertical axes.

Figure 5:
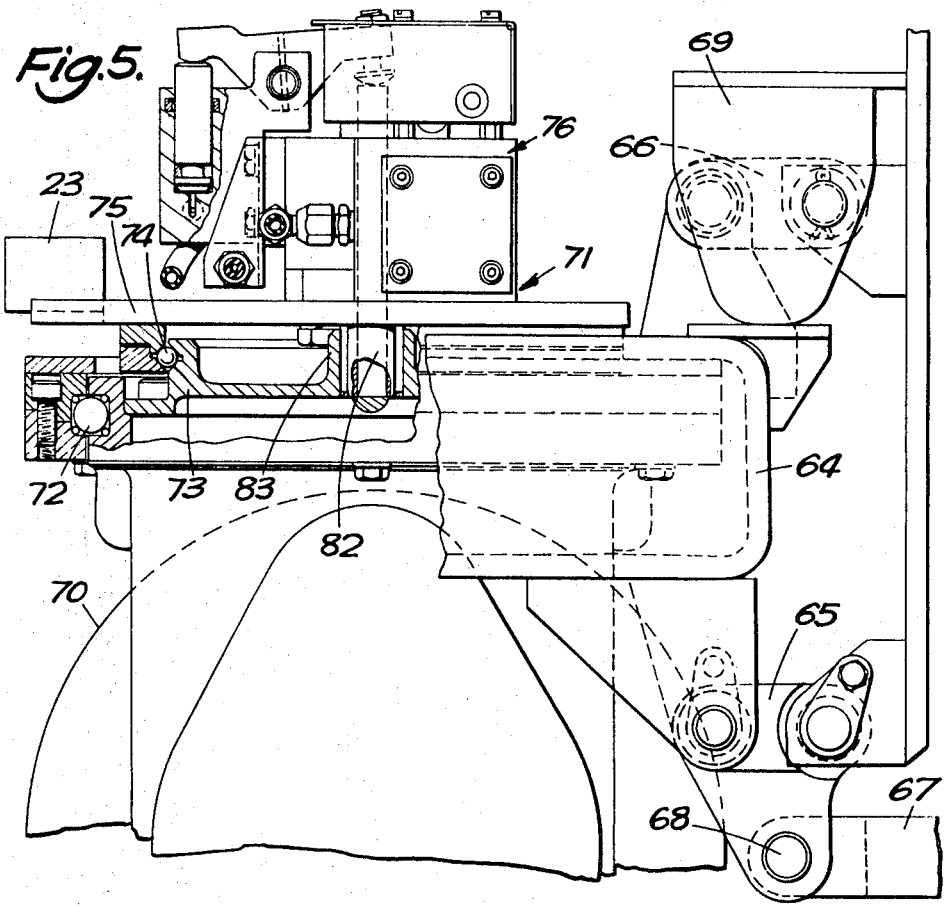
FIG. 5 is a part-vertical section, part-side elevation through the wheel unit of FIG. 4.

FIGS. 4 and 5 show in greater detail the wheel unit 1 of FIG. 1. The wheel unit 2 is of similar construction.

As seen in FIGS 4 and 5 the wheel unit comprises a support frame 64 which is connected in as articulated manner to the chassis of the truck by a parallel linkage comprising two sets of spaced lower links 65 and an intermediate upper link 66. The wheel unit may thus swing up and down relatively to the chassis of the truck. This up and down movement is restrained by a tension rod 67 which is pivotally connected at 68 to one of the links 65 and extends along the length of the truck (as shown in FIG. 1) to be pivotally connected to the corresponding link of the wheel unit 2. Upward movement of the wheel unit is also limited by resilient abutments 69 mounted on the truck chassis.

The wheel (indicated at 70) of the wheel unit is supported and driven in known manner on a structure 71 which is rotatable about a vertical axis in bearings 72 on the support frame 64. The structure 71 comprises a circular part 73 which carries the wheel 70, and is relatively rotatable (in bearings 74) to a plate 75. The part 73 and plate 75 are normally locked against relative rotation so that steering of the wheel is effected by rotation of the plate 75, the aforementioned link 22 being pivotally connected to the boss 23 on the plate 75.

Figure 7:
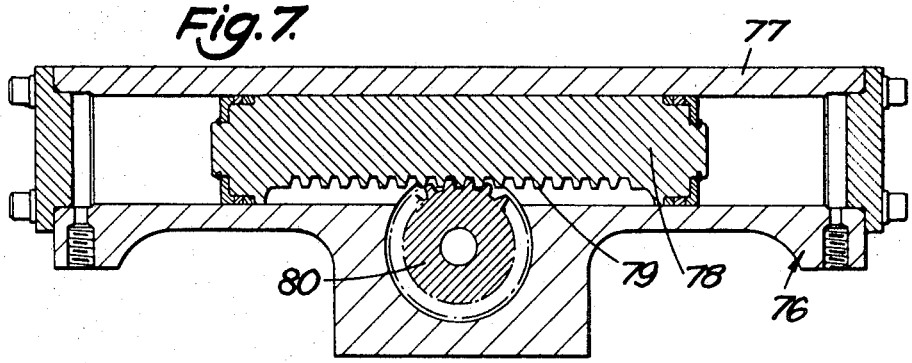
FIG. 7 is a horizontal cross section through the hydraulic actuator of FIG. 6.
Figure 8:
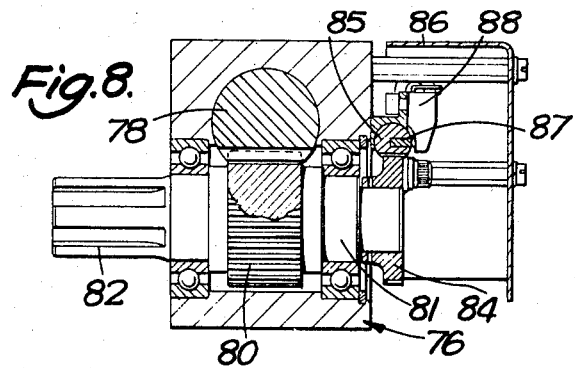
FIG. 8 is a vertical cross section through the hydraulic actuator of FIG. 6.

Mounted on the plate 75 is an hydraulic actuator indicated at 76 and shown in greater detail in FIGS. 6, 7 and 8. The hydraulic actuator comprises a cylinder 77 in which is reciprocable a piston member 78 formed along one side thereof with a toothed rack 79. The toothed rack 79 is in mesh with a pinion 80 which is carried by a shaft 81. The lower end 82 of the shaft 81 is splined and in engagement with a splined central boss 83 on the part 73. Opposite ends of the cylinder 77 are in communication through solenoid-operated control valves with the hydraulic system of the truck so that the piston member 78 may be reciprocated hydraulically in the cylinder 77. It will be appreciated that when the piston member 78 is hydraulically locked against movement in the cylinder 77 part 73 will be locked to the plate 75 so that those parts and the wheel can only rotate together during steering of the wheel by movement of the link 22. However if the piston member 78 is moved longitudinally in the cylinder 77, the pinion 80 and shaft 81 will be rotated and the part 73 will be rotated relatively to the plate 75 thus changing the angular position of the wheel relative to the plate.

As best seen in FIG. 8, the shaft 81 carries a further pinion 84 of the same diameter as the pinion 80, which further pinion is in mesh with a rack on a sliding switch element 85 which is mounted for longitudinal sliding movement is a switch assembly 86 on top of the hydraulic actuator 76. The sliding switch element 85 is formed from insulating material and has an electrically conducting bar 87 embedded in it against which rest spaced electrical contacts 88. The bar 87 has a central insulated portion. Since the sliding switch element 85 moves in synchronism with the piston member 78 the contacts 88 will be made and broken in accordance with the position of the hydraulic actuator. These switch contacts are used to control the operation of the hydraulic actuators and associated mechanisms in a manner described later.

The other wheel units 2, 3 and 4 are similar to the wheel unit 1 just described except that in the wheel units 3 and 4 the support frame 64 for the wheel unit is not articulately mounted on the truck chassis but is rigidly mounted thereon, the elements 65, 66, 67, 68 and 69 being omitted.

Figure 12:
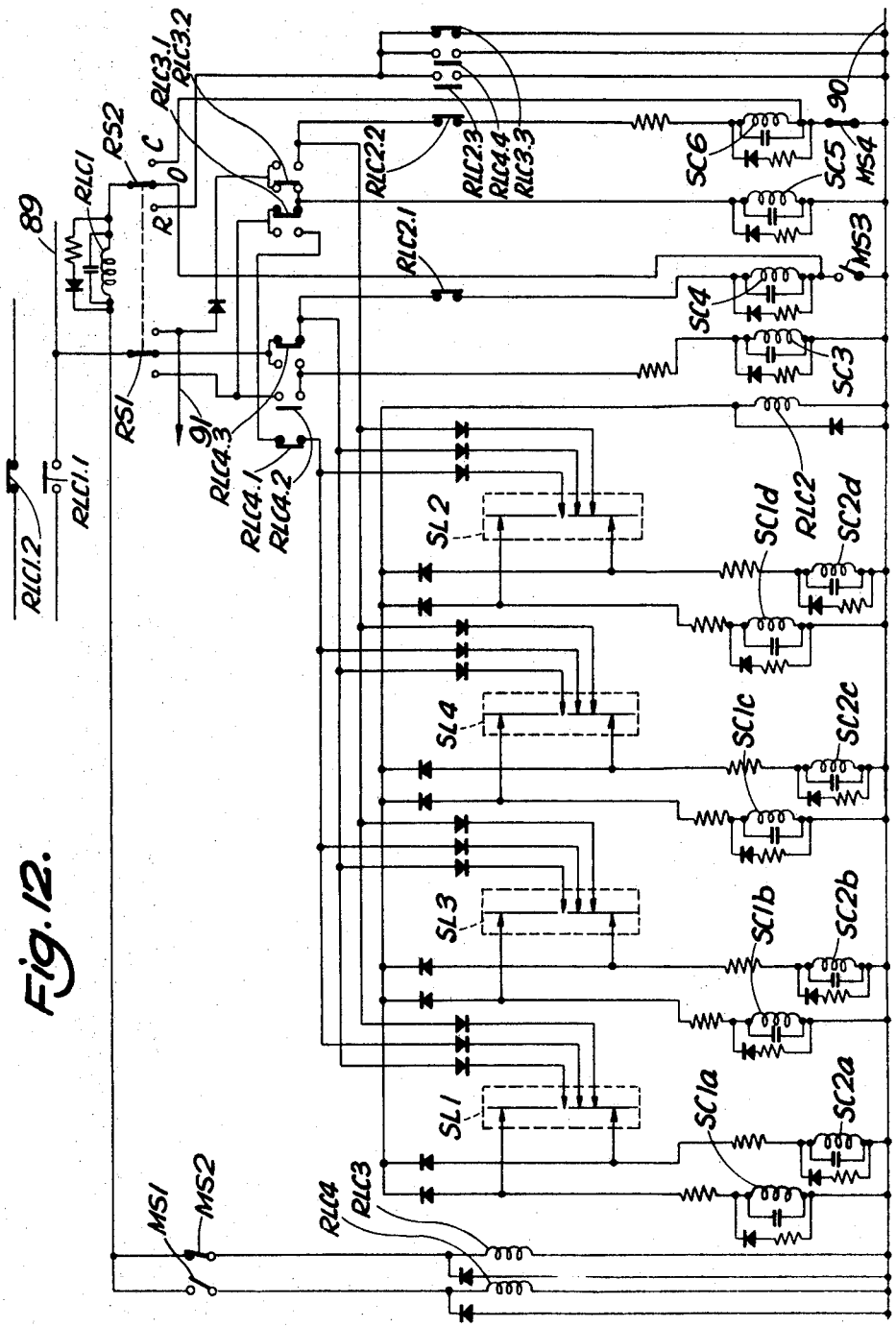
FIG. 12 is a circuit diagram showing the electrical control circuit for adjusting the wheels and steering mechanism.

As mentioned above the hydraulically operated pins 44 and 45 and the hydraulic actuators 76 are controlled by solenoid-operated control valves and the circuit for controlling the operation of the various elements of the truck is shown in FIG 12 and will now be described.

Referring to the circuit diagram, FIG. 12, the positive line is indicated at 89 and the negative line at 90. The important elements of the circuit are listed below:

SL1, SL2, SL3, and SL4 are the slide switches associated with the wheel units 1, 2, 3 and 4 respectively. (i.e., the slide switches 87, 88 described with reference to FIGS. 6 and 8.)

MS2 and MS3 are the two microswitches associated with the pin 44 and MS1 and MS4 are the microswitches associated with pin 45 (i.e., the microswitches 62 and 63 described with reference to FIG. 3). All four microswitches are normally closed. MS1 is opened when pin 45 is inserted and MS4 is opened when pin 45 is withdrawn. MS2 is opened when pin 44 is inserted and MS3 is opened when pin 44 is withdrawn.

RLC1 is a relay controlling the hydraulic pump and traction motors of the vehicle and has two contacts: RLC1.1 which is normally open and RLC1.2 which is normally closed.

RLC2 is a relay having normally closed contacts RLC2.1 and RLC2.2 and normally open contact RLC2.3.

RLC3 is a relay having changeover contacts RLC3.1 and RLC3.2 and a normally open contact RLC3.3.

RLC4 is a relay having a normally closed contact RLC4.1, normally open contacts RLC4.2 and RLC4.4, and a changeover contact RLC4.3.

SC1a, SC1b, SC1c and SC1d are the energizing coils of solenoid-operated hydraulic valves which, when operated, cause the hydraulic actuators 76 to effect adjustment of the wheels clockwise about their vertical axes.

SC2a, SC2b, SC2c, and SC2d are the energizing coils of solenoid-operated hydraulic valves which, when operated, cause the hydraulic actuators 76 to effect adjustment of the wheels anticlockwise about their vertical axes.

SC3 is the energizing coil of a solenoid-operated hydraulic valve which, when operated, allows pin 45 to move downwards under the action of its spring into engagement with the hole in the plate 37.

SC4 is the energizing coil of a solenoid-operated hydraulic valve which, when operated, causes pin 44 to be driven out of engagement with the hole in the plate 37.

SC5 is the energizing coil of a solenoid-operated hydraulic valve which when operated allows the pin 44 to move downwards into engagement with the hole in the plate 37.

SC6 is the energizing coil of a solenoid-operated hydraulic valve which when operated causes the pin 45 to be driven out of engagement with the hole in the plate 37.

RS1 and RS2 are three-position selector switches which are ganged together. The selector switch can take three positions indicated in FIG. 12 as R, O and C respectively. O is the "Ordinary" position for normal forward or reverse travel of the truck with the wheels in the position shown in FIG. 9. C is the "Crab" position in which the truck is movable and steerable sideways and the wheel units are in the position shown in FIG. 11. R is the "Rotate" position in which the vehicle can be rotated about a vertical axis and the wheels are in the position shown in FIG. 10.

In the position shown in FIG. 12 the selector switches RS1 and RS2 are in the O position. In this position the pin 45 is in engagement with the plate 37 and the pin 44 is out of engagement. Accordingly the microswitches MS1 and MS3 are open and the microswitches MS2 and MS4 are closed. All circuits are open except that through MS2 which energizes relay RLC3, closing contact RLC3.3.

In this position of the selector switch the vehicle can be steered in forward and reverse using the steering mechanism in the manner described above. If it is then required to drive the truck sideways the selector switch is moved to the C or "Crab" position. Switching to this position energizes coil SC5 through contact RLC 3.2 and also energizes relay RLC1 through MS4. Energization of relay RLC1 closes contact RLC1.1 and opens contact RLC1.2. Contact RLC1.2 is in the circuit for driving the wheels of the truck and opening of this contact ensures that the truck cannot be driven while the subsequent adjustments are going on. Closing of contact RLC1.1 starts the hydraulic pump motor and energization of coil SC5 operates its associated hydraulic valve to drive the pin 44 into engagement with the hole in the plate 37. When the pin 44 is fully in engagement, MS2 is opened deenergizing the relay RLC3 and causing contacts RLC3.2 to change over. This completes the circuits through the slide switches SL1 to SL4, the coils SC2a, SC2b, SC2c and SC2d, and the relay RLC2. Energization of the relay RLC2 opens the contact RLC2.2 temporarily preventing energization of the coil SC6 which would otherwise withdraw the pin 45. Energization of the coils SC2a to SC2d operates their associated hydraulic control valves to cause the hydraulic actuators 76 to effect anticlockwise rotation of the wheels to the position shown in FIG. 11. When the wheels reach the required position the circuit is automatically broken through the slide switches SL1 etc. and the coils SC2a to SC2d are deenergized. Similarly the relay RLC2 is deenergized so that contact RLC2.2 closes. This energizes the coil SC6 causing the pin 45 to be withdrawn. Withdrawl of the pin 45 opens MS4 to deenergize relay RLC1. The contact RLC1.1 therefore opens to stop the hydraulic pump motor and the contact RLC1.2 closes so that the wheels can again be driven. All circuits are now open and the steering mechanism is operable for steering the truck as it is driven sideways.

When it is required to rotate the truck about a vertical axis by moving the wheels to the position shown in FIG. 10, the selector switch RS1, RS2 is moved to the R position. Assuming that this selection is made from the O position in which pin 45 is inserted and pin 44 is withdrawn then MS1 and MS3 will be open and MS2 and MS4 will be closed. When the selector switch is turned to the R position a circuit is made through contact RLC3.1 energizing the coil SC5. Also a circuit is made through contact RLC3.3 energizing the relay RLC1 to close the contact RLC1.1 and start the hydraulic pump motor and open contact RLC1.2 to interrupt the drive circuit. Energization of the coil SC5 operated its associated hydraulic control valve to cause the pin 44 to be driven in. As the pin 44 is driven in the microswitch MS2 is opened deenergizing the relay RLC3. This changes over contacts RLC3.1 and opens contact RLC3.3. However the circuit to the motor continues to be completed by the relay RLC2 closing contact RLC2.3. Changing over of the contacts RLC3.1 also energizes the coils SC2a, SC2b and SC2c so that wheels 1, 2 and 4 are rotated anticlockwise whereas coil SC1d is energized causing wheel 2 to rotate clockwise. (This is necessary since if the wheel 2 were also to rotate anticlockwise to its required position it would need to rotate through a greater angle that it is capable). When the wheels reach the position shown in FIG. 10 they are automatically stopped by the slide switches. When the wheels reach the required positions the circuits through the slide switches are opened and relay RLC2 is deenergized opening contacts RLC2.3 again to stop the hydraulic pump and motor. The only circuit now left made is through a circuit (not shown) taken off through the lead indicated at 91, this circuit being arranged to reverse the direction of drive of the wheel 4 relatively to the other wheels so that the wheels are driven in the manner shown in FIG. 10 to rotate the truck itself about a vertical axis.

Although there has only been described in detail the manner in which the circuit operates when switching from the Ordinary or O position to either of the other two positions, the circuit is so arranged that it may be switched from any position to any other position.

I claim:
1. An industrial truck having four ground wheels, means for individually adjusting each wheel angularly about a vertical axis whereby the truck may be driven in a plurality of alternative directions according to the adjusted positions of the wheels, and a steering mechanism for simultaneously effecting steering movements of the wheels, which steering mechanism comprises a first linkage connecting a first pair of wheels so that those wheels are steered in the same direction as each other, a second linkage connecting the second pair of wheels so that those wheels are steered in the same direction as each other, said second linkage including a lever mounted on a pivotal support which lever, when pivoted in one sense, causes said linkage to steer the second pair of wheels in one direction and, when pivoted in the opposite sense, causes said linkage to steer the second pair of wheels the opposite direction, and a member connectable between the two linkages by two alternative connections, one of which connections so connects the two linkages that the two pairs of wheels are steered in the same direction and the other of which connection so connects the two linkages that the two pairs of wheels are steered in opposite directions, each said member alternatively connectable to said lever by two detachable connections disposed on opposite sides of said pivotal support, each detachable connection between said member and lever comprising a pin movably mounted on one part and engageable with an aperture on the other part.

2. An industrial truck according to claim 1 wherein both of said alternative connections can be connected at the same time to lock the steering mechanism.

3. A An industrial truck according to claim 1 wherein the pin is mounted on said member and is engageable with an aperture on said lever.

4. An industrial truck according to claim 1 wherein each wheel is mounted on a support which is in turn mounted on the truck for rotation about a vertical axis, said supports being connected by said linkages for effecting steering of the wheels, and wherein said means for individually adjusting each wheel angularly about a vertical axis comprise means for rotating each wheel about a vertical axis relatively to its support.

5. An industrial truck according to claim 1 wherein fluid energized means are provided for moving the pin.

6. An industrial truck according to claim 5 wherein a spring is provided to urge the pin into engagement with said aperture, said fluid energized means acting to withdraw the pin from the aperture against the action of the spring.

7. An industrial truck according to claim 5 wherein electrical control means are provided to operate said fluid energized means for moving the pin.